(12) United States Patent
Herrmann

(10) Patent No.: US 6,356,054 B1
(45) Date of Patent: Mar. 12, 2002

(54) DESKTOP STAND FOR AN ELECTRONIC DEVICE HAVING EMBEDDED CHARGING CONTROL

(75) Inventor: John Edward Herrmann, Penang (MY)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/746,891

(22) Filed: Dec. 24, 2000

(51) Int. Cl.⁷ ........................ H01M 10/44; H01M 10/46
(52) U.S. Cl. ....................................... 320/115
(58) Field of Search ................................ 320/114, 115, 320/112, 110; 429/99, 100; D13/103, 107, 108

(56) References Cited

U.S. PATENT DOCUMENTS

| | | | | |
|---|---|---|---|---|
| 5,525,888 A | * | 6/1996 | Toya | .................... 320/115 X |
| 5,659,236 A | * | 8/1997 | Hahn | .................... 320/115 X |
| 6,049,192 A | * | 4/2000 | Kfoury et al. | .......... 320/115 X |
| 6,127,803 A | * | 10/2000 | Wang et al. | ............ 320/115 X |

* cited by examiner

Primary Examiner—Edward H. Tso
(74) Attorney, Agent, or Firm—Philip H. Burrus, IV

(57) ABSTRACT

This invention includes a charger with at least two pockets capable of charging both a portable electronic device and a spare battery without charging circuitry in the charger. The invention includes takes advantage of an electronic device having charging circuitry disposed within, and also having external contacts for receiving an auxiliary battery. In a preferred embodiment, the invention couples the auxiliary contacts from a front pocket to battery contacts in the rear pocket. The connections are made directly with no charging circuitry in the series path. In so doing, when the portable electronic device and spare battery are placed in the charger, the portable electronic device's internal charging circuitry charges both batteries simultaneously.

9 Claims, 3 Drawing Sheets

DESKTOP STAND FOR AN ELECTRONIC DEVICE HAVING EMBEDDED CHARGING CONTROL

TECHNICAL FIELD

This invention relates generally to desktop chargers for portable electronic devices and, more specifically, to desktop chargers having two pockets for charging electronic devices and spare batteries.

BACKGROUND

Portable electronic devices are becoming as standard an accessory as a wallet or purse. People are carrying cellular phones, personal digital assistants (PDAs), pagers and the like in record numbers. For example, according to the Cellular Telecommunications Industry Association (CTIA), cellular telephone usage in the United States increased 27% between 1999 and 2000. As of July, 2000, there were over 97 million cellular subscribers in the United States alone.

As people talk more and more on cellular telephones, they require more and more energy from batteries. Consequently, people often carry two or more batteries during the day. Nothing is more frustrating than missing a casting call for a Broadway musical because your phone battery is dead.

Cellular phone manufacturers understand the need for multiple batteries and thus sell desktop chargers that have multiple pockets in them. These chargers generally have a front pocket for accommodating a cellular phone, and a rear pocket for accommodating an extra battery. While these chargers effectively charge multiple batteries (e.g. the battery connected to the phone and the battery in the rear pocket), there is a problem in that the chargers require charging circuitry that increases the cost of the system. As nickel and lithium batteries have very specific charging algorithms, the desktop charger that charges a battery in the rear pocket must have intricate charging circuitry that adds cost to the charger. Consequently, some people are unable to afford such complex chargers.

There is thus a need for a less expensive charger capable of charging multiple batteries.

DETAILED DESCRIPTION OF THE INVENTION

Figure 1:
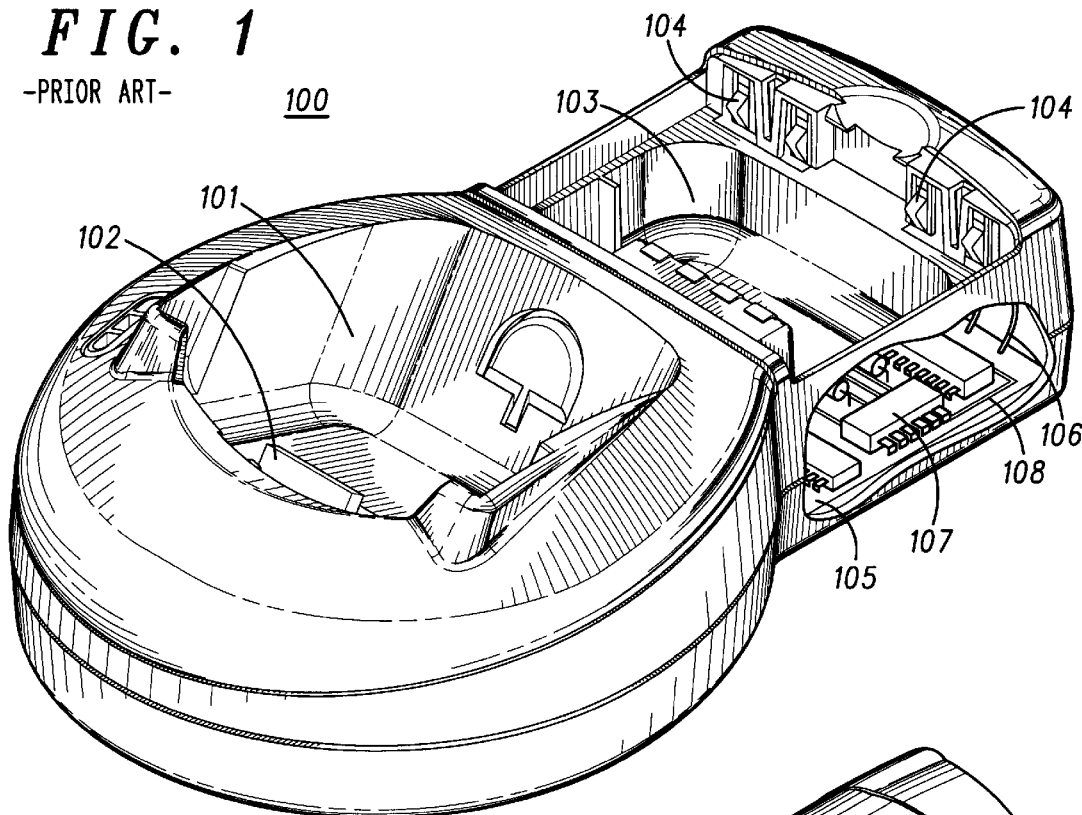
FIG. 1 is an example of a prior art charger.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Conventional electronic charging systems comprise four dis electronic device, a battery, a power supply and a charger. By way of example, if the electronic device is a cellular telephone, the charging system typically includes a power supply that plugs into the wall, a desktop charger, the phone itself, and at least one detachable battery. Each of these components has a unique function.

The power supply generally converts alternating current (AC) power coming out of a wall outlet into direct current (DC) power that a phone can handle. For example, in the United States, the standard power coming from a wall outlet is 110V AC, which has a frequency of 60 Hz. If this raw power were connected to a sensitive electronic device like a cellular telephone, the phone would not be able to handle it. Consequently, the phone may be damaged. The role of the power supply is to convert this AC power into something manageable. Power supplies generally step down the voltage and convert the power into DC, at a level of around 5 volts.

Desktop chargers, by contrast, take the DC power generated by the power supply and manipulate it with battery specific algorithms to properly charge a battery. Rechargeable batteries are manufactured from a variety of different chemicals. These include nickel, cadmium, and lithium. Each chemistry has a specific charging algorithm associated with it. For example, single cell lithium batteries cannot be charged above about 4.1 V. If they are overcharged, they may release combustible gasses at high temperatures, which can lead to compromised performance. Nickel batteries, on the other hand, are charged until the temperature of the cell starts rising rapidly. Thus, the charger must be able to taper, step, ramp and pulse voltage and current in the proper amounts at the proper times to correctly charge the batteries. These functions often require expensive electronic circuitry.

The battery and the phone are reasonably simple. The phone, of course, transmits and receives cellular telephone calls. The battery stores the energy delivered by the charger. As phones have become more complex with more features, their power demands have increased correspondingly. Thus, many people today carry multiple batteries. When the first one dies, they simply remove it and switch in a second.

The way a traditional system works, one first plugs the power supply into the wall. The person then connects the power supply cable to the desktop charger input. The person then inserts the phone into the desktop charger. Once inserted, the desktop charger begins to charge the battery connected to the phone. Chargers often include two pockets: one for a phone with battery connected and a second for a spare battery. The circuitry in the charger negotiates between the pockets to charge each sequentially. The phone pocket generally has priority, while the battery pocket comes second.

Consumers found it expensive to purchase four different accessories. At the same time, the charging circuitry found in the desktop charger has become more compact, sometimes fitting on a single microprocessor with a few additional components. In response to consumer's complaints about the expense of the large number of accessories, manufacturers started putting charging circuitry directly into the phone. By way of example, the Motorola StarTac, V-Series, and i1000, as well as the Nokia 6100 series and the Ericsson T28 series phones all include internal charging circuitry. As a result, the power supply could now be connected directly to the phone, thereby eliminating the need for the desktop charger.

Now consumers only needed three accessories: phone, power supply, and battery. This resulted in a charging system that was much less expensive. This simplification had two primary drawbacks: First, the phone no longer seated vertically in a charger, it merely laid on a flat surface. Secondly, and more importantly, the user no longer had a means of charging the spare battery. As phones do not typically have two pockets, the only way to charge a spare battery was to completely charge the first battery, disconnect it from the phone, connect the second battery and then allow it to charge.

This invention includes a charging system that eliminates the need for sophisticated circuitry in the charger. The invention takes advantage of the charging circuitry disposed within the phone and provides a means of charging two batteries in parallel.

Referring now to FIG. 1, illustrated therein is a prior art charger 100 for a cellular phone. (It is worthy to note that while a cellular phone charger is being used for exemplary purposes, other devices, including the BlackBerry pager, and the Palm personal digital assistant all use similar platforms.) The charger 100 includes a first pocket 101 for receiving a cellular phone. When the phone is inserted, the phone mates with the charging connector 102. It is through the charging connector 102 that power is supplied to the phone.

In addition to the first pocket 101, the charger also includes a rear pocket 103 for holding a spare battery. The spare battery couples to the charger 100 by way of electrical contacts 104 that connect to mating contacts on the battery. The power from the power supply is brought in from a power supply connector (not shown) in the rear of the charger. The power is then delivered to the printed circuit board 105 (PCB). Disposed on the PCB 105 are various integrated circuit (IC) chips 107 and electrical traces 108. The IC chips 107 may include voltage regulators, current regulators, microprocessors and transistors. The IC chips 107 and traces 108 comprise a charging circuit responsible for ramping, tapering, stepping, commencement and cessation of charging voltage and current. Additionally, the charging circuit may monitor battery parameters including voltage, current, capacity, temperature, and pressure. The electrical circuit couples to the electrical contacts 104 by way of an interconnect 106. This interconnect 106 may be wire, flexible circuit, or other form of electrical connector.

Figure 2:
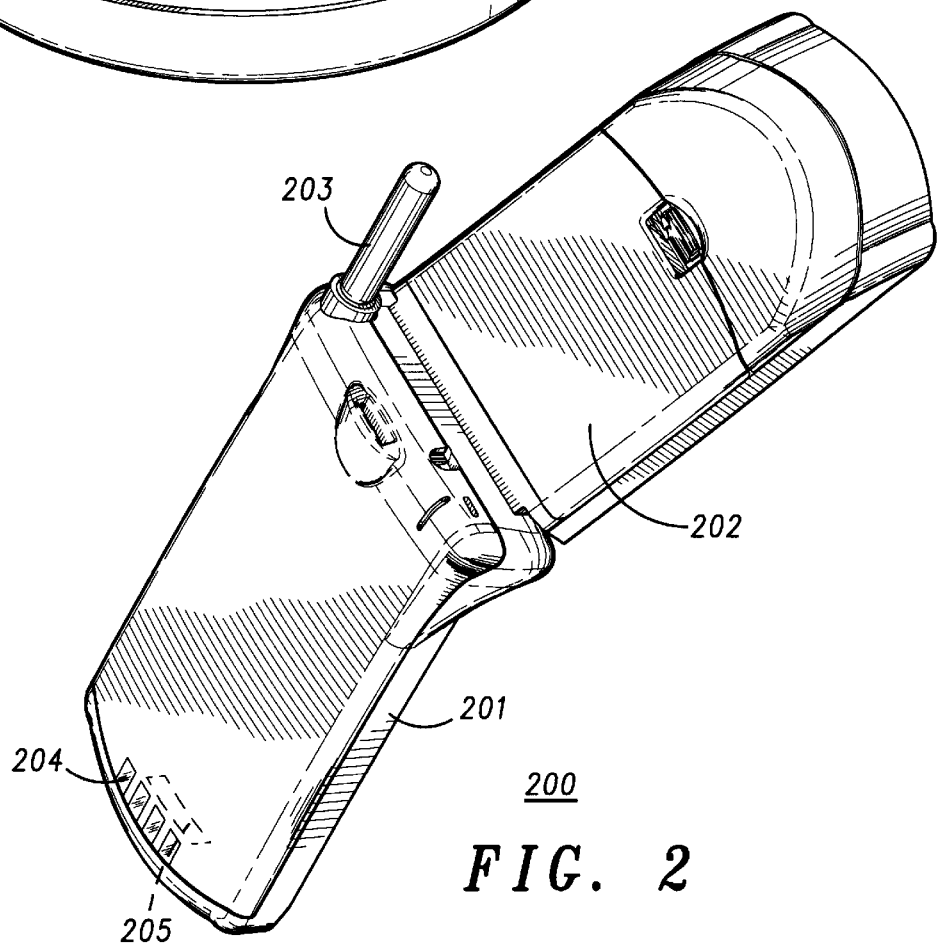
FIG. 2 is an example of a portable electronic device in accordance with this invention.

Referring now to FIG. 2, illustrated therein is an electronic device 200 in accordance with the invention. For exemplary purposes, the electronic device here is a cellular telephone 201, having a battery 202 and an antenna 203. The cellular telephone has two sets of connectors 204,205 disposed thereon. The phone charging connector 205 is for mating with the charging connector 202 in a charger. The second set of contacts 204 is used for connecting an auxiliary battery. By way of example, in the StarTac series telephones manufactured by Motorola, an auxiliary battery couples to four contacts in the rear portion of the phone. These contacts correspond to power, ground, thermistor, and data. When a power supply is coupled to a StarTac having an auxiliary battery connected, the phone charges both the primary battery (represented by 202 in FIG. 2) and the auxiliary battery in parallel.

Figure 3:
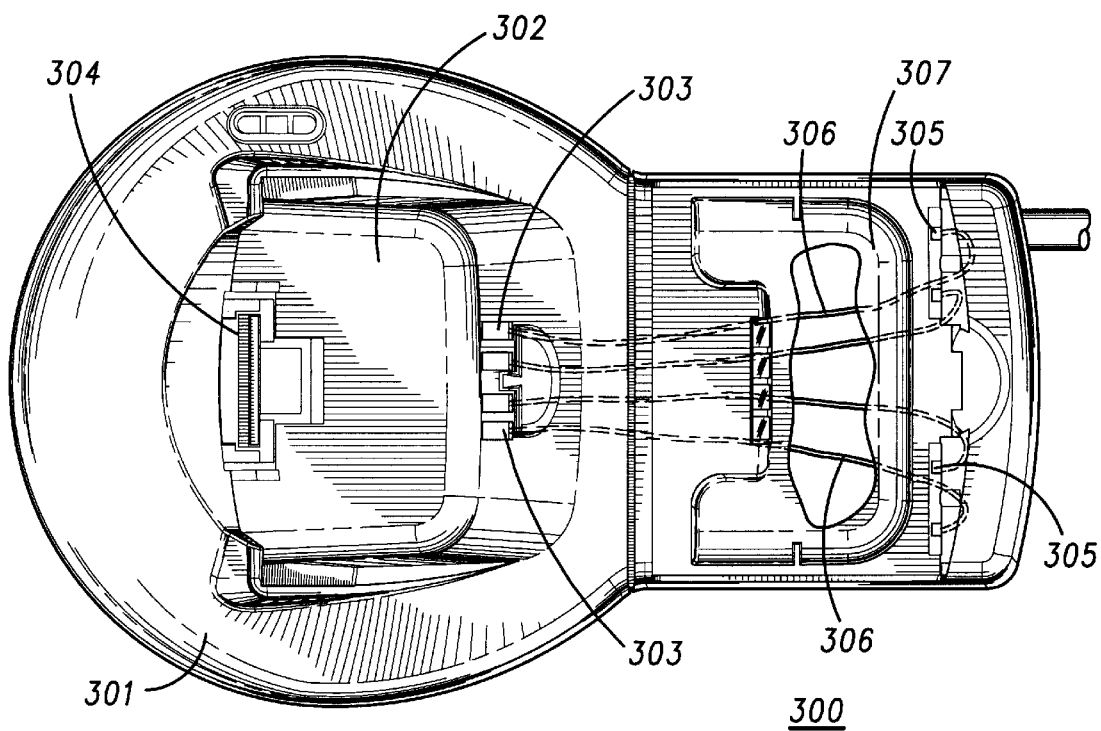
FIG. 3 is a desktop charger in accordance with this invention.

Referring now to FIG. 3, illustrated therein is a charger 300 having no internal charging circuitry in accordance with the invention. The charger 300 includes housing 301 having a front pocket 302 for receiving a phone and a rear pocket 307 for receiving a battery. The front pocket includes a power connector 304 for providing power from the from the power supply to the telephone. The charger 300 includes no internal circuit comprised of IC chips. There is no circuit for stepping, ramping and tapering voltage and current.

Charging of the battery in the rear pocket is completed by coupling the charger auxiliary terminals 303 directly to the electrical contacts 305. This coupling may be via wire connections 306, or via a dummy PCB having only traces and no discrete elements. In so doing, when a spare battery is placed in the rear pocket 307, the phone believes that an auxiliary battery has been connected to the phone. The charging circuitry in the phone then charges the batteries in parallel. Thus, two batteries can be charged at a single time without the need for expensive circuitry in the charger. The net result is an inexpensive two-pocket charger.

Figure 4:
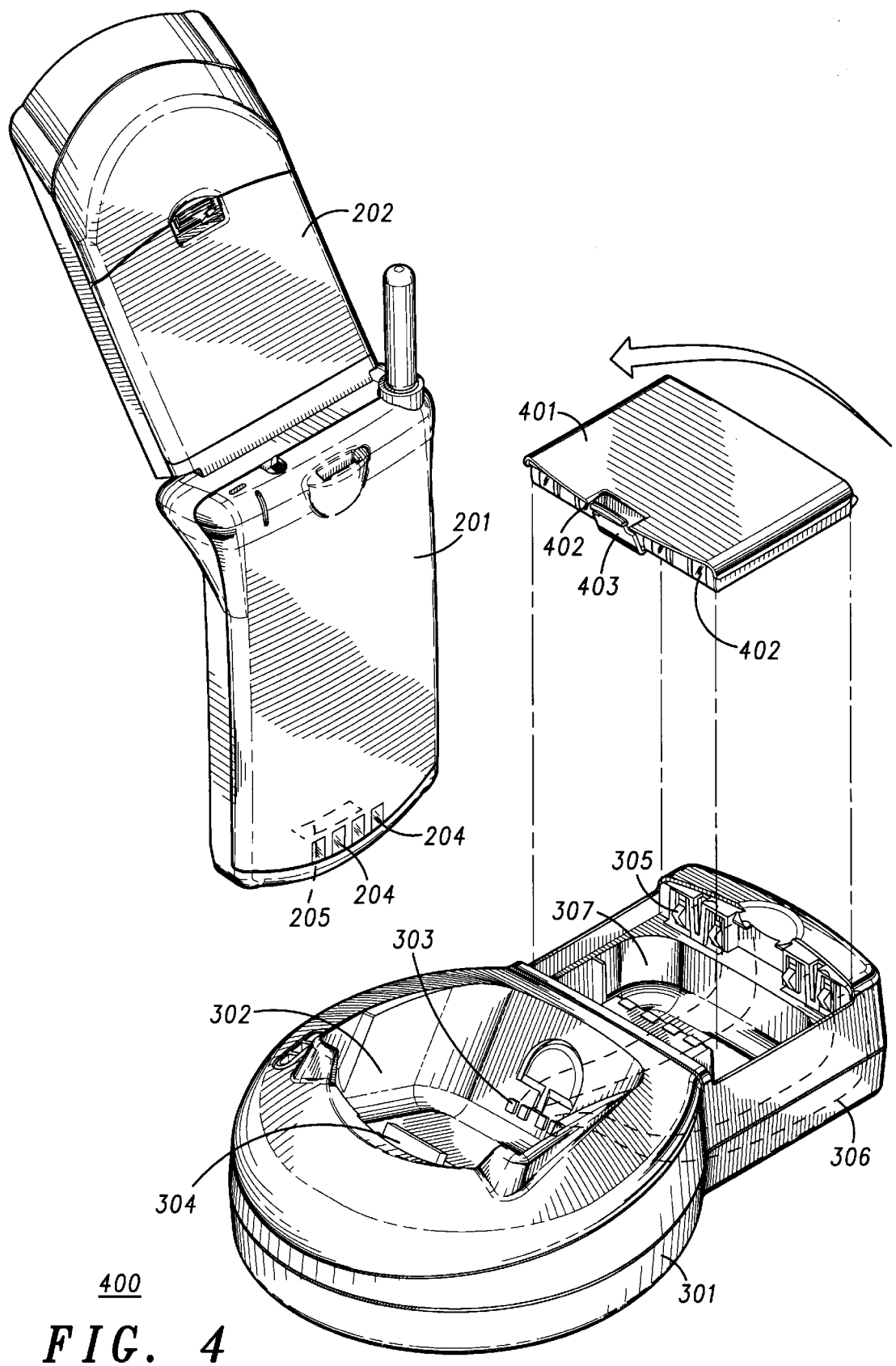
FIG. 4 is an exemplary embodiment of a charging system in accordance with this invention.

To illustrate by example, please refer to FIG. 4. Here, a phone 201 is inserted into the front pocket 302 of the charger housing 301. The auxiliary battery contacts 204 connect with the charger auxiliary battery contacts 303 when the power connector 304 mates with the phone power connector 205. The user may then place a spare battery 401 into the rear pocket 307, connecting the battery terminals 402 to the electrical contacts 305. The spare battery 401 and the phone have now been connected by the connecting wires 306. The phone "thinks" that an external battery is attached, and charges both the primary battery 202 and the spare battery 401 simultaneously.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A battery charger comprising:
   a. at least two pockets, wherein the at least two pockets comprises a first pocket for accommodating a portable electronic device having charging circuitry disposed therein;
   b. a power connector for supplying power from a power supply;
   c. at least one auxiliary charger contact; and
   d. at least one electrical contact;
   wherein the at least one auxiliary charger contact is directly elecrically connected to the at least one electrical contact, further wherein when the portable electronic device is coupled to the first pocket and a battery is coupled to the at least one auxliary charger contact, the battery is electrically coupled to the charging circuitry disposed within the portable electronic device.

2. The charger of claim 1, wherein the at least two pockets comprise a front pocket and a rear pocket.

3. The charger of claim 2, wherein the at least one auxiliary charger contact is disposed in the front pocket and the at least one electrical contact is disposed in the rear pocket.

4. The charger of claim 3, wherein the connection means for connecting the at least one auxiliary contact to the at least one electrical contact is selected from the group consisting of wire, printed circuit board and flexible circuit substrate.

5. The charger of claim 4, wherein the front pocket is for receiving a portable electronic device and the rear pocket is for receiving a spare battery.

6. The charger of claim 5, wherein the portable electronic device is selected from the group consisting of cellular telephones, radios, pagers, and personal data assistants.

7. The charger of claim 6, wherein the spare battery is charged by charging circuitry disposed within the phone.

8. A method of charging a battery, the method comprising the steps of:
   a. Providing a charger having:
      i. at least two pockets;
      ii. a power connector for supplying power from a power supply;

iii. at least one auxiliary charger contact; and iv. at least one electrical contact, wherein the at least one auxiliary charger contact is electrically connected to the at least one electrical contact;

b. inserting an electrical device having a first battery into the charger;

c. inserting a spare battery into the charger;

d. providing power to the electronic device such that the power passes through charging circuitry disposed in the electronic device to the first battery and the spare battery.

9. The method of claim 8, wherein the portable electronic device is selected from the group consisting of cellular telephones, radios, pagers, and personal data assistants.

\* \* \* \* \*